United States Patent
Kruzeniski et al.

(10) Patent No.: US 8,411,046 B2
(45) Date of Patent: Apr. 2, 2013

(54) COLUMN ORGANIZATION OF CONTENT

(75) Inventors: Michael J. Kruzeniski, Seattle, WA (US); Paula Guntaur, Seattle, WA (US); Brian M. Wilson, Mercer Island, WA (US); Chad Aron Voss, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 579 days.

(21) Appl. No.: 12/469,419

(22) Filed: May 20, 2009

(65) Prior Publication Data

US 2010/0103124 A1   Apr. 29, 2010

Related U.S. Application Data

(60) Provisional application No. 61/107,945, filed on Oct. 23, 2008, provisional application No. 61/107,935, filed on Oct. 23, 2008, provisional application No. 61/107,921, filed on Oct. 23, 2008.

(51) Int. Cl.
*G06F 3/033* (2006.01)

(52) U.S. Cl. .......................... 345/173; 715/803; 715/818

(58) Field of Classification Search .................. 345/173; 715/803, 818
See application file for complete search history.

(56) References Cited

U.S. PATENT DOCUMENTS

| | | |
|---|---|---|
| 5,189,732 A | 2/1993 | Kondo |
| 5,258,748 A | 11/1993 | Jones |
| 5,463,725 A | 10/1995 | Henckel et al. |
| 5,515,495 A | 5/1996 | Ikemoto |
| 5,574,836 A | 11/1996 | Broemmelsiek |
| 5,675,329 A | 10/1997 | Barker |
| 5,860,073 A | 1/1999 | Ferrel et al. |
| 5,905,492 A | 5/1999 | Straub et al. |
| 5,914,720 A | 6/1999 | Maples et al. |
| 5,963,204 A | 10/1999 | Ikeda et al. |
| 6,008,816 A | 12/1999 | Eisler |

(Continued)

FOREIGN PATENT DOCUMENTS

| | | |
|---|---|---|
| CN | 1749936 | 3/2006 |
| CN | 1936797 | 3/2007 |

(Continued)

OTHER PUBLICATIONS

"International Search Report", Application No. PCT/US2010/028553, Application Filing Date: Mar. 24, 2010,(Nov. 9, 2010),9 pages.

(Continued)

*Primary Examiner* — Amare Mengitsu
*Assistant Examiner* — Shawna Stepp Jones
(74) *Attorney, Agent, or Firm* — Wolfe-SBMC

(57) ABSTRACT

Column organization of content is described. In an implementation, a mobile communications device configures a user interface to include a plurality of representations of content arranged according to a plurality of columns that permits navigation between first and second said columns upon detection of a gesture input via a touchscreen of the mobile communications device. The user interface is displayed on a display device of the mobile communications device. The first column is configured for vertical navigation through each of the plurality of representations and the second column includes a filtered subset of the plurality of representations such that at least one of the representations is included in the first column and not the second column.

19 Claims, 8 Drawing Sheets

U.S. PATENT DOCUMENTS

| | | |
|---|---|---|
| 6,385,630 B1 | 5/2002 | Ejerhed |
| 6,396,963 B2 | 5/2002 | Shaffer |
| 6,424,338 B1 | 7/2002 | Andersone |
| 6,507,643 B1 | 1/2003 | Groner |
| 6,662,023 B1 | 12/2003 | Helle |
| 6,697,825 B1 | 2/2004 | Underwood et al. |
| 6,784,925 B1 | 8/2004 | Tomat |
| 6,865,297 B2 | 3/2005 | Loui |
| 6,876,312 B2 | 4/2005 | Yu |
| 6,904,597 B2 | 6/2005 | Jin |
| 6,961,731 B2 | 11/2005 | Holbrook |
| 6,983,310 B2 | 1/2006 | Rouse |
| 6,987,991 B2 | 1/2006 | Nelson |
| 7,013,041 B2 | 3/2006 | Miyamoto |
| 7,058,955 B2 | 6/2006 | Porkka |
| 7,065,385 B2 | 6/2006 | Jarrad et al. |
| 7,065,386 B1 | 6/2006 | Smethers |
| 7,111,044 B2 | 9/2006 | Lee |
| 7,133,707 B1 | 11/2006 | Rak |
| 7,133,859 B1 | 11/2006 | Wong |
| 7,139,800 B2 | 11/2006 | Bellotti et al. |
| 7,158,123 B2 * | 1/2007 | Myers et al. .................. 345/173 |
| 7,178,111 B2 | 2/2007 | Glein et al. |
| 7,216,588 B2 | 5/2007 | Suess |
| 7,249,326 B2 | 7/2007 | Stoakley et al. |
| 7,280,097 B2 | 10/2007 | Chen |
| 7,283,620 B2 | 10/2007 | Adamczyk |
| 7,289,806 B2 | 10/2007 | Morris et al. |
| 7,296,184 B2 | 11/2007 | Derks et al. |
| 7,336,263 B2 | 2/2008 | Valikangas |
| 7,369,647 B2 | 5/2008 | Gao et al. |
| 7,388,578 B2 | 6/2008 | Tao |
| 7,403,191 B2 | 7/2008 | Sinclair |
| 7,447,520 B2 | 11/2008 | Scott |
| 7,461,151 B2 | 12/2008 | Colson et al. |
| 7,479,949 B2 | 1/2009 | Jobs |
| 7,480,870 B2 | 1/2009 | Anzures |
| 7,483,418 B2 | 1/2009 | Maurer |
| 7,496,830 B2 | 2/2009 | Rubin |
| 7,593,995 B1 | 9/2009 | He et al. |
| 7,606,714 B2 | 10/2009 | Williams et al. |
| 7,610,563 B2 | 10/2009 | Nelson et al. |
| 7,614,018 B1 | 11/2009 | Ohazama et al. |
| 7,619,615 B1 | 11/2009 | Donoghue |
| 7,640,518 B2 | 12/2009 | Forlines et al. |
| 7,657,849 B2 | 2/2010 | Chaudhri et al. |
| 7,671,756 B2 | 3/2010 | Herz et al. |
| 7,702,683 B1 | 4/2010 | Kirshenbaum |
| 7,730,425 B2 | 6/2010 | de los Reyes et al. |
| 7,755,674 B2 | 7/2010 | Kaminaga |
| 7,834,861 B2 | 11/2010 | Lee |
| 7,877,707 B2 | 1/2011 | Westerman et al. |
| 7,889,180 B2 | 2/2011 | Byun et al. |
| 7,983,718 B1 | 7/2011 | Roka |
| 8,006,276 B2 | 8/2011 | Nakagawa et al. |
| 8,086,275 B2 | 12/2011 | Wykes |
| 8,131,808 B2 | 3/2012 | Aoki et al. |
| 8,150,924 B2 | 4/2012 | Buchheit et al. |
| 8,175,653 B2 | 5/2012 | Smuga |
| 8,238,876 B2 | 8/2012 | Teng |
| 8,250,494 B2 | 8/2012 | Butcher |
| 8,255,473 B2 | 8/2012 | Eren et al. |
| 8,269,736 B2 | 9/2012 | Wilairat |
| 8,280,901 B2 | 10/2012 | Mcdonald |
| 8,289,688 B2 | 10/2012 | Behar et al. |
| 8,355,698 B2 | 1/2013 | Teng et al. |
| 8,385,952 | 2/2013 | Friedman et al. |
| 2001/0022621 A1 | 9/2001 | Squibbs |
| 2002/0000963 A1 | 1/2002 | Yoshida et al. |
| 2002/0018051 A1 | 2/2002 | Singh |
| 2002/0035607 A1 | 3/2002 | Checkoway |
| 2002/0060701 A1 | 5/2002 | Naughton et al. |
| 2002/0070961 A1 | 6/2002 | Xu et al. |
| 2002/0091755 A1 | 7/2002 | Narin |
| 2002/0128036 A1 | 9/2002 | Yach et al. |
| 2002/0129061 A1 | 9/2002 | Swart et al. |
| 2002/0138248 A1 | 9/2002 | Corston-Oliver et al. |
| 2002/0142762 A1 | 10/2002 | Chmaytelli et al. |
| 2002/0154176 A1 | 10/2002 | Barksdale et al. |
| 2003/0003899 A1 | 1/2003 | Tashiro et al. |
| 2003/0008686 A1 | 1/2003 | Park et al. |
| 2003/0011643 A1 | 1/2003 | Nishihihata |
| 2003/0040300 A1 | 2/2003 | Bodic |
| 2003/0073414 A1 | 4/2003 | Capps |
| 2003/0096604 A1 | 5/2003 | Vollandt |
| 2003/0105827 A1 | 6/2003 | Tan et al. |
| 2003/0135582 A1 | 7/2003 | Allen et al. |
| 2003/0187996 A1 | 10/2003 | Cardina et al. |
| 2003/0222907 A1 | 12/2003 | Heikes et al. |
| 2003/0225846 A1 | 12/2003 | Heikes et al. |
| 2004/0068543 A1 | 4/2004 | Seifert |
| 2004/0078299 A1 | 4/2004 | Down-Logan |
| 2004/0111673 A1 * | 6/2004 | Bowman et al. ............... 715/513 |
| 2004/0185883 A1 | 9/2004 | Rukman |
| 2004/0212586 A1 | 10/2004 | Denny |
| 2004/0217954 A1 | 11/2004 | O'Gorman et al. |
| 2004/0250217 A1 | 12/2004 | Tojo et al. |
| 2005/0054384 A1 * | 3/2005 | Pasquale et al. ............... 455/566 |
| 2005/0060647 A1 * | 3/2005 | Doan et al. ..................... 715/514 |
| 2005/0060665 A1 | 3/2005 | Rekimoto |
| 2005/0079896 A1 | 4/2005 | Kokko et al. |
| 2005/0085215 A1 | 4/2005 | Kokko |
| 2005/0085272 A1 | 4/2005 | Anderson et al. |
| 2005/0114788 A1 | 5/2005 | Fabritius |
| 2005/0143138 A1 | 6/2005 | Lee et al. |
| 2005/0182798 A1 * | 8/2005 | Todd et al. ..................... 707/200 |
| 2005/0183021 A1 | 8/2005 | Allen et al. |
| 2005/0184999 A1 | 8/2005 | Daioku |
| 2005/0198159 A1 | 9/2005 | Kirsch |
| 2005/0216300 A1 | 9/2005 | Appelman et al. |
| 2005/0223057 A1 | 10/2005 | Buchheit et al. |
| 2005/0232166 A1 | 10/2005 | Nierhaus |
| 2005/0250547 A1 | 11/2005 | Salman et al. |
| 2005/0273614 A1 | 12/2005 | Ahuja |
| 2005/0280719 A1 | 12/2005 | Kim |
| 2006/0004685 A1 | 1/2006 | Pyhalammi et al. |
| 2006/0015736 A1 | 1/2006 | Callas et al. |
| 2006/0015812 A1 | 1/2006 | Cunningham |
| 2006/0026013 A1 | 2/2006 | Kraft |
| 2006/0059430 A1 | 3/2006 | Bells |
| 2006/0070005 A1 | 3/2006 | Gilbert et al. |
| 2006/0074771 A1 | 4/2006 | Kim |
| 2006/0103623 A1 | 5/2006 | Davis |
| 2006/0129543 A1 | 6/2006 | Bates et al. |
| 2006/0135220 A1 | 6/2006 | Kim et al. |
| 2006/0136773 A1 | 6/2006 | Kespohl |
| 2006/0152803 A1 | 7/2006 | Provitola |
| 2006/0172724 A1 | 8/2006 | Linkert et al. |
| 2006/0173911 A1 | 8/2006 | Levin et al. |
| 2006/0199598 A1 | 9/2006 | Lee et al. |
| 2006/0218234 A1 | 9/2006 | Deng et al. |
| 2006/0246955 A1 | 11/2006 | Nirhamo |
| 2006/0253801 A1 | 11/2006 | Okaro et al. |
| 2006/0259870 A1 | 11/2006 | Hewitt et al. |
| 2006/0259873 A1 | 11/2006 | Mister |
| 2006/0271520 A1 | 11/2006 | Ragan |
| 2006/0281448 A1 | 12/2006 | Plestid et al. |
| 2006/0293088 A1 | 12/2006 | Kokubo |
| 2006/0294396 A1 | 12/2006 | Witman |
| 2007/0005716 A1 | 1/2007 | LeVasseur et al. |
| 2007/0011610 A1 | 1/2007 | Sethi et al. |
| 2007/0015532 A1 | 1/2007 | Deelman |
| 2007/0024646 A1 | 2/2007 | Saarinen |
| 2007/0035513 A1 | 2/2007 | Sherrard et al. |
| 2007/0038567 A1 | 2/2007 | Allaire et al. |
| 2007/0054679 A1 | 3/2007 | Cho et al. |
| 2007/0061306 A1 | 3/2007 | Pell et al. |
| 2007/0061714 A1 | 3/2007 | Stuple et al. |
| 2007/0067272 A1 | 3/2007 | Flynt |
| 2007/0073718 A1 | 3/2007 | Ramer |
| 2007/0076013 A1 | 4/2007 | Campbell |
| 2007/0080954 A1 | 4/2007 | Griffin |
| 2007/0082707 A1 | 4/2007 | Flynt et al. |
| 2007/0082708 A1 | 4/2007 | Griffin |
| 2007/0106635 A1 | 5/2007 | Frieden et al. |
| 2007/0127638 A1 | 6/2007 | Doulton |
| 2007/0157089 A1 | 7/2007 | Van Os et al. |

| | | | |
|---|---|---|---|
| 2007/0171192 A1 | 7/2007 | Seo et al. | |
| 2007/0182595 A1 | 8/2007 | Ghasabian | |
| 2007/0185847 A1 | 8/2007 | Budzik et al. | |
| 2007/0192707 A1 | 8/2007 | Maeda et al. | |
| 2007/0198420 A1 | 8/2007 | Goldstein | |
| 2007/0211034 A1 | 9/2007 | Griffin et al. | |
| 2007/0214429 A1 | 9/2007 | Lyudovyk et al. | |
| 2007/0216651 A1 | 9/2007 | Patel | |
| 2007/0225022 A1 | 9/2007 | Satake | |
| 2007/0233654 A1 | 10/2007 | Karlson | |
| 2007/0238488 A1* | 10/2007 | Scott | 455/566 |
| 2007/0247435 A1 | 10/2007 | Benko et al. | |
| 2007/0250583 A1 | 10/2007 | Hardy | |
| 2007/0253758 A1 | 11/2007 | Suess | |
| 2007/0255831 A1 | 11/2007 | Hayashi et al. | |
| 2007/0256029 A1 | 11/2007 | Maxwell | |
| 2007/0257891 A1 | 11/2007 | Esenther et al. | |
| 2007/0257933 A1 | 11/2007 | Klassen | |
| 2007/0262964 A1 | 11/2007 | Zotov et al. | |
| 2007/0263843 A1 | 11/2007 | Foxenland | |
| 2007/0273663 A1 | 11/2007 | Park et al. | |
| 2007/0280457 A1 | 12/2007 | Aberethy | |
| 2007/0281747 A1 | 12/2007 | Pletikosa | |
| 2008/0005668 A1 | 1/2008 | Mavinkurve | |
| 2008/0032681 A1 | 2/2008 | West | |
| 2008/0036743 A1 | 2/2008 | Westerman | |
| 2008/0048986 A1 | 2/2008 | Khoo | |
| 2008/0052370 A1 | 2/2008 | Snyder | |
| 2008/0057910 A1 | 3/2008 | Thoresson et al. | |
| 2008/0057926 A1 | 3/2008 | Forstall et al. | |
| 2008/0066010 A1 | 3/2008 | Brodersen et al. | |
| 2008/0076472 A1 | 3/2008 | Hyatt | |
| 2008/0082934 A1 | 4/2008 | Kocienda et al. | |
| 2008/0084970 A1 | 4/2008 | Harper | |
| 2008/0085700 A1 | 4/2008 | Arora | |
| 2008/0102863 A1 | 5/2008 | Hardy | |
| 2008/0114535 A1 | 5/2008 | Nesbitt | |
| 2008/0120571 A1 | 5/2008 | Chang et al. | |
| 2008/0132252 A1 | 6/2008 | Altman et al. | |
| 2008/0153551 A1 | 6/2008 | Baek et al. | |
| 2008/0155425 A1 | 6/2008 | Murthy et al. | |
| 2008/0162651 A1 | 7/2008 | Madnani | |
| 2008/0165132 A1 | 7/2008 | Weiss | |
| 2008/0165136 A1 | 7/2008 | Christie et al. | |
| 2008/0165163 A1 | 7/2008 | Bathiche | |
| 2008/0167058 A1 | 7/2008 | Lee et al. | |
| 2008/0168403 A1* | 7/2008 | Westerman et al. | 715/863 |
| 2008/0172609 A1 | 7/2008 | Rytivaara | |
| 2008/0180399 A1 | 7/2008 | Cheng | |
| 2008/0182628 A1 | 7/2008 | Lee et al. | |
| 2008/0189658 A1 | 8/2008 | Jeong et al. | |
| 2008/0198141 A1 | 8/2008 | Lee et al. | |
| 2008/0200142 A1 | 8/2008 | Abdel-Kader et al. | |
| 2008/0208973 A1 | 8/2008 | Hayashi | |
| 2008/0222560 A1 | 9/2008 | Harrison | |
| 2008/0222569 A1 | 9/2008 | Champion | |
| 2008/0242362 A1 | 10/2008 | Duarte | |
| 2008/0259042 A1 | 10/2008 | Thorn | |
| 2008/0261660 A1 | 10/2008 | Huh et al. | |
| 2008/0263457 A1 | 10/2008 | Kim et al. | |
| 2008/0270558 A1 | 10/2008 | Ma | |
| 2008/0297475 A1 | 12/2008 | Woolf et al. | |
| 2008/0299999 A1 | 12/2008 | Lockhart et al. | |
| 2008/0301046 A1 | 12/2008 | Martinez | |
| 2008/0301575 A1 | 12/2008 | Fermon | |
| 2008/0307364 A1 | 12/2008 | Chaudhri et al. | |
| 2008/0309626 A1 | 12/2008 | Westerman et al. | |
| 2008/0316177 A1 | 12/2008 | Tseng | |
| 2008/0317240 A1 | 12/2008 | Chang et al. | |
| 2009/0007017 A1 | 1/2009 | Anzures et al. | |
| 2009/0012952 A1 | 1/2009 | Fredriksson | |
| 2009/0029736 A1 | 1/2009 | Kim et al. | |
| 2009/0037469 A1 | 2/2009 | Kirsch | |
| 2009/0051671 A1 | 2/2009 | Konstas | |
| 2009/0061837 A1 | 3/2009 | Chaudhri et al. | |
| 2009/0061948 A1 | 3/2009 | Lee et al. | |
| 2009/0064055 A1 | 3/2009 | Chaudhri | |
| 2009/0077649 A1 | 3/2009 | Lockhart | |
| 2009/0083656 A1 | 3/2009 | Dokhon | |

| | | |
|---|---|---|
| 2009/0085851 A1 | 4/2009 | Lim |
| 2009/0085878 A1 | 4/2009 | Heubel |
| 2009/0089215 A1 | 4/2009 | Newton |
| 2009/0106694 A1 | 4/2009 | Kraft et al. |
| 2009/0109243 A1 | 4/2009 | Kraft |
| 2009/0117942 A1 | 5/2009 | Boningue et al. |
| 2009/0140061 A1 | 6/2009 | Schultz et al. |
| 2009/0140986 A1 | 6/2009 | Karkkainen et al. |
| 2009/0146962 A1 | 6/2009 | Ahonen et al. |
| 2009/0153492 A1 | 6/2009 | Popp |
| 2009/0160809 A1 | 6/2009 | Yang |
| 2009/0163182 A1 | 6/2009 | Gatti et al. |
| 2009/0164888 A1 | 6/2009 | Phan |
| 2009/0205041 A1 | 8/2009 | Michalske |
| 2009/0228825 A1 | 9/2009 | Van Os et al. |
| 2009/0265662 A1 | 10/2009 | Bamford |
| 2009/0284482 A1 | 11/2009 | Chin |
| 2009/0293014 A1 | 11/2009 | Meuninck et al. |
| 2009/0298547 A1 | 12/2009 | Kim et al. |
| 2009/0307589 A1 | 12/2009 | Inose et al. |
| 2009/0307623 A1 | 12/2009 | Agarawala et al. |
| 2009/0313584 A1 | 12/2009 | Kerr et al. |
| 2009/0315847 A1 | 12/2009 | Fujii |
| 2010/0008490 A1 | 1/2010 | Gharachorloo et al. |
| 2010/0075628 A1 | 3/2010 | Ye |
| 2010/0079413 A1 | 4/2010 | Kawashima et al. |
| 2010/0087169 A1 | 4/2010 | Lin |
| 2010/0087173 A1 | 4/2010 | Lin |
| 2010/0100839 A1 | 4/2010 | Tseng et al. |
| 2010/0105370 A1 | 4/2010 | Kruzeniski |
| 2010/0105424 A1 | 4/2010 | Smuga |
| 2010/0105438 A1 | 4/2010 | Wykes |
| 2010/0105439 A1 | 4/2010 | Friedman |
| 2010/0105440 A1 | 4/2010 | Kruzeniski |
| 2010/0105441 A1 | 4/2010 | Voss |
| 2010/0107067 A1 | 4/2010 | Vaisanen |
| 2010/0107068 A1 | 4/2010 | Butcher |
| 2010/0107100 A1 | 4/2010 | Schneekloth |
| 2010/0145675 A1 | 6/2010 | Lloyd et al. |
| 2010/0146437 A1 | 6/2010 | Woodcock et al. |
| 2010/0159966 A1 | 6/2010 | Friedman |
| 2010/0159994 A1 | 6/2010 | Stallings et al. |
| 2010/0159995 A1 | 6/2010 | Stallings et al. |
| 2010/0167699 A1 | 7/2010 | Sigmund et al. |
| 2010/0180233 A1 | 7/2010 | Kruzeniski |
| 2010/0216491 A1 | 8/2010 | Winkler et al. |
| 2010/0248688 A1 | 9/2010 | Teng |
| 2010/0248689 A1 | 9/2010 | Teng |
| 2010/0248741 A1 | 9/2010 | Setlur et al. |
| 2010/0248787 A1 | 9/2010 | Smuga |
| 2010/0295795 A1 | 11/2010 | Wilairat |
| 2010/0311470 A1 | 12/2010 | Seo et al. |
| 2010/0321403 A1 | 12/2010 | Inadome |
| 2011/0018806 A1 | 1/2011 | Yano |
| 2011/0055773 A1 | 3/2011 | Agarawala et al. |
| 2011/0093778 A1 | 4/2011 | Kim et al. |
| 2011/0231796 A1 | 9/2011 | Vigil |
| 2012/0028687 A1 | 2/2012 | Wykes |
| 2012/0050185 A1 | 3/2012 | Davydov et al. |
| 2012/0179992 A1 | 7/2012 | Smuga |
| 2012/0212495 A1 | 8/2012 | Butcher |
| 2012/0244841 A1 | 9/2012 | Teng |

FOREIGN PATENT DOCUMENTS

| | | |
|---|---|---|
| CN | 102197702 | 9/2011 |
| EP | 0583060 | 2/1994 |
| EP | 1752868 | 2/2007 |
| JP | 2004227393 | 8/2004 |
| JP | 2004357257 | 12/2004 |
| KR | 200303655 | 2/2003 |
| KR | 20060019198 | 3/2006 |
| KR | 1020070036114 | 4/2007 |
| KR | 1020070098337 | 10/2007 |
| KR | 20070120368 | 12/2007 |
| KR | 1020080025951 | 3/2008 |
| KR | 1020080076390 A | 8/2008 |
| KR | 100854333 | 9/2008 |
| KR | 1020080084156 | 9/2008 |
| KR | 1020080113913 A | 12/2008 |

| | | |
|---|---|---|
| KR | 1020090041635 A | 4/2009 |
| TW | 201023026 | 6/2010 |
| WO | WO-2005026931 | 3/2005 |
| WO | WO-2005027506 | 3/2005 |
| WO | WO-2006019639 | 2/2006 |
| WO | WO-2007121557 | 11/2007 |
| WO | WO-2007134623 | 11/2007 |
| WO | WO-2008030608 | 3/2008 |
| WO | WO-2008031871 | 3/2008 |
| WO | WO-2008035831 | 3/2008 |
| WO | WO-2009000043 | 12/2008 |
| WO | WO-2009049331 | 4/2009 |
| WO | WO-2010048229 | 4/2010 |
| WO | WO-2010048448 | 4/2010 |
| WO | WO-2010048519 | 4/2010 |
| WO | WO-2010117643 | 10/2010 |
| WO | WO-2010135155 | 11/2010 |

OTHER PUBLICATIONS

"PCT Search Report and Written Opinion", PCT Application No. PCT/US2010/038730, (Jan. 19, 2011),8 pages.

"PCT Search Report and Written Opinion", Application No. PCT/US2010/028699, (Oct. 4, 2010),10 pages.

"PCT Search Report and Written Opinion", Application No. PCT/US2010/028555, (Oct. 12, 2010),10 pages.

"Alltel Adds Dedicated Search Key to Phones", Retrieved from: <http://www.phonescoop.com/news/item.php?n=2159> on Nov. 26, 2008., (Apr. 12, 2007), 2 Pages.

"Apple iPhone—8GB AT&T", Retrieved from: <http://nytimes.com.com/smartphones/apple-iphone-8gb-at/4515-6452_7-32309245.html> on Nov. 20, 2008, (Jun. 29, 2007), 11 pages.

"Ask Web Hosting", Retrieved from: <http://www.askwebhosting.com/story/18501/HTC_FUZE_From_ATandampT_Fuses_Fun_and_Function_With_the_One-Touch_Power_of_TouchFLO_3D.html> on May 5, 2009., (Nov. 11, 2008), 3 pages.

"Blackberry office tools: Qwerty Convert", Retrieved from: <http://blackberrysoftwarelist.net/blackberry/download-software/blackberry-office/qwerty_convert.aspx> on Nov. 20, 2008, 1 page.

"Calc4M", Retrieved from: <http://www.hellebo.com/Calc4M.html> on Dec. 11, 2008, (Sep. 10, 2008), 4 Pages.

"Content-Centric E-Mail Message Analysis in Litigation Document Reviews", Retrieved from: http://www.busmanagement.com/article/Issue-14/Data-Management/Content-Centric-E-Mail-Message-Analysis-in-Litigation-Document-Reviews/., (May 6, 2009), 4 Pages.

"Dial a number", Retrieved from: <http://www.phonespell.org/ialhelp.html> on Nov. 20, 2008, 1 page.

"DuoSense™ Multi-Touch Gestures", Retrieved from: <http://www.n-trig.com/Data/Uploads/Misc/DuoSenseMTG_final.pdf>, (Jul. 2008), 4 pages.

"Elecont Quick Desktop 1.0.43", Retrieved from: <http://handheld.softpedia.com/get/System-Utilities/Launcher-Applications/Elecont-Quick-Desktop-72131.shtml> on May 5, 2009., (Mar. 13, 2009), 2 pages.

"Exclusive: Windows Mobile 7 to Focus on Touch and Motion Gestures", Retrieved from: <http://anti-linux.blogspot.com/2008/08/exclusive-windows-mobile-7-to-focus-on.html> on May 6, 2009, (Aug. 1, 2008), 14 pages.

"Freeware.mobi", Retrieved from: <http://www.palmfreeware.mobi/download-palette.html>, on Nov. 6, 2008, (Oct. 9, 2001), 2 pages.

"How do you dial 1-800-FLOWERS", Retrieved from: <http://blogs.msdn.com/windowsmobile/archive/2007/02/06/how-do-you-dial-1-800-flowers.aspx> on Nov. 20, 2008, (Feb. 6, 2007), 24 pages.

"HTC Shows HTC Snap with Snappy Email Feature", Retrieved from: <http://www.wirelessandmobilenews.com/smartphones/> on May 5, 2009, 10 Pages.

"IntelliScreen—New iPhone App Shows Today Screen Type Info in Lock Screen", Retrieved from: <http://justanotheriphoneblog.com/wordpress//2008/05/13/intelliscreen-new-iphone-app-shows-today-screen-type-info-on-lock-screen/> on Nov. 12, 2008, (May 13, 2008), 11 pages.

"Internet Explorer Window Restrictions", Retrieved from: <http://www.addict3d.org/news/2012/download.html> on Oct. 22, 2008, Microsoft TechNet,(Oct. 22, 2008), 6 pages.

"Introduction to Windows Touch", Retrieved from: <http://download.microsoft.com/download/a/d/f/adf1347d-08dc-41a4-9084-623b1194d4b2/Win7_touch.docx>, (Dec. 18, 2008), pp. 1-7.

"Keyboard (5)", Retrieved from: <http://landru.uwaterloo.ca/cgi-bin/man.cgi?section=5&topic=keyboard>on Dec. 11, 2008., (Aug. 11, 1997), 8 Pages.

"Keyboard Shortcuts", Retrieved from: <http://www.pctoday.com/editorial/article.asp?article=articles%2F2005%2Ft0311%2F26t11%2F26t11.asp> on Aug. 3, 2009., (Nov. 2005), 5 pages.

"Kiosk Browser Chrome Customization Firefox 2.x", Retrieved from: <http://stlouis-shopper.com/cgi-bin/mozdev-wiki/,pl?ChromeCustomization> on Oct. 22, 2008 Making a new chrome for the kiosk browser, Kiosk Project Kiosk Browser Chrome Customization Firefox-2.x,(Aug. 16, 2007), 2 pages.

"Live Photo Gallery—Getting Started—from Camera to Panorama", Retrieved from: <http://webdotwiz.spaces.live.com/blog/cns!2782760752B93233!1729.entry> on May 5, 2009., (Sep. 2008), 7 Pages.

"MIDTB Tip Sheet: Book Courier", Retrieved from: <http://www.midtb.org/tipsbookcourier.htm> on Dec. 11, 2008., (Sep. 26, 2005), 6 Pages.

"Mobile/UI/Designs/TouchScreen", Retrieved from: <https://wiki.mozilla.org/Mobile/UI/Designs/TouchScreen> on May 6, 2009., (Feb. 3, 2009), 15 Pages.

"Multi-touch", Retrieved from <http://en.wikipedia.org/wiki/Multi-touch#Microsoft_Surface> on Apr. 24, 2009, (Apr. 17, 2009), 8 pages.

"Nokia E61 Tips and Tricks for Keyboard Shortcuts", Retrieved from: <http://www.mobiletopsoft.com/board/1810/nokia-e61-tips-and-tricks-for-keyboard-shortcuts.html> on Dec. 17, 2008., (Jan. 27, 2006), 2 Pages.

"Oracle8i Application Developer's Guide—Advanced Queuing Release 2 (8.1.6)", Retrieved from: http://www.cs.otago.ac.nz/oradocs/appdev.817/a76938/adq01in5.htm on May 6, 2009., (Dec. 1999), 8 pages.

"Oracle8i Application Developer's Guide—Advanced Queuing", Retrieved from: http://www.cs.umbc.edu/help/oracle8/server.815/a68005/03_adq1i.htm on May 6, 2009., (Feb. 1999), 29 Pages.

"Oracle8i Concepts Release 8.1.5", Retrieved from: http://www.cs.umbc.edu/help/oracle8/server.815/a67781/c16queue.htm on May 6, 2009., (Feb. 1999), 10 Pages.

"Palette Extender 1.0.2", Retrieved from: <http://palette-extender.en.softonic.com/symbian> on Nov. 6, 2008, (Jan. 21, 2003), 2 pages.

"Parallax Scrolling", Retrieved from: <http://en.wikipedia.org/wiki/Parallax_scrolling> on May 5, 2009., (May 4, 2009), 3 Pages.

"PocketShield—New Screenlock App for the HTC Diamond and Pro", Retrieved from: <http://wmpoweruser.com/?tag=htc-touch-diamond> on Nov. 12, 2008, (Nov. 6, 2008), 13 pages.

"Remapping the Keyboard", Retrieved from: <http://publib.boulder.ibm.com/infocenter/hodhelp/v9r0/index.jsp?topic=/com.ibm.hod9.doc/help/assignkey.html> on Dec. 11, 2008., (Jul. 15, 2005), 5 Pages.

"SecureMe-Anti-Theft Security Application for S60 3rd", Retrieved from: <http://www.killermobile.com/newsite/mobile-software/s60-applications/secureme-%11-anti%11theft-security-application-for-s60-3rd.htm> on Nov. 12, 2008, (Nov. 11, 2008), 2 pages.

"Symbian Applications", Retrieved from: <http://symbianfullversion.blogspot.com/2008_12_01_archive.html> on May 5, 2009., (Jan. 2009), 51 Pages.

"Touch Shell Free", Retrieved from: <http://www.pocketpcfreeware.mobi/download-touch-shell-free.html> on May 5, 2009., (Feb. 23, 2009), 2 Pages.

"Winterface Review", Retrieved from: <http://www.mytodayscreen.com/winterface-review/> on Nov. 12, 2008, (Jul. 9, 2008), 42 pages.

"Womma", Retrieved from: <http://www.womma.org/blog/links/wom-trends/> on May 5, 2009., (2007), 70 Pages.

Dolcourt, Jessica "Webware", Retrieved from: <http://news.cnet.com/webware/?categoryId=2010> on May 5, 2009., 13 Pages.

Gade, Lisa "Samsung Alias u740", Retrieved from: <http://www.mobiletechreview.com/phones/Samsung-U740.htm> on Nov. 20, 2008, (Mar. 14, 2007), 6 pages.

Gao, Rui "A General Logging Service for Symbian based Mobile Phones", Retrieved from: <http://www.nada.kth.se/utbildning/grukth/exjobb/rapportlistor/2007/rapporter07/gao_rui_07132.pdf.> on Jul. 17, 2008, (Feb. 2007), pp. 1-42.

Ha, Rick et al., "SIMKEYS: An Efficient Keypad Configuration for Mobile Communications", Retrieved from: <http://ieeexplore.ieee.org/stamp/stamp.jsp?arnumber=01362557.> on Dec. 17, 2008, (Nov. 2004), 7 Pages.

Harrison, Richard "Symbian OS C++ for Mobile Phones vol. 3", Retrieved from: <http://_www.amazon.co.uk/Symbian-OS-Mobile-Phones-Press/dp/productdescription/0470066415> on Oct. 23, 2008, Symbian Press,(Jun. 16, 2003), 4 pages.

Hickey, Andrew R., "Google Android has Landed; T-Mobile, HTC Unveil G1", Retrieved from: <http://www.crn.com/retail/210603348> on Nov. 26, 2008., (Sep. 23, 2008), 4 pages.

Kcholi, Avi "Windows CE .NET Interprocess Communication", Retrieved from http://msdn.microsoft.com/en-us/library/ms836784.aspx on Jul. 17, 2008., (Jan. 2004), 15 Pages.

Mann, Richard et al., "Spectrum Analysis of Motion Parallax in a 3D Cluttered Scene and Application to Egomotion", Retrieved from: <http://www.cs.uwaterloo.ca/~mannr/snow/josa-mann-langer.pdf.>, (Sep. 2005), pp. 1717-1731.

Mao, Jeng "Comments on Verizon Wireless Messaging Services, LLC", Retrieved from: http://www.ntia.doc.gov/osmhome/warnings/comments/verizon.htm on May 6, 2009., (Aug. 18, 2000), 5 Pages.

Mei, Tao et al., "Probabilistic Multimodality Fusion for Event Based Home Photo Clustering", Retrieved from: <http://ieeexplore.ieee.org/stamp/stamp.jsp?tp=&arnumber=04036960.>, (Dec. 26, 2006), pp. 1757-1760.

Nordgren, Peder "Development of a Touch Screen Interface for Scania Interactor", Retrieved from: <http://www.cs.umu.se/education/examina/Rapporter/PederNordgren.pdf>, (Apr. 10, 2007), 67 Pages.

Oliver, Sam "Potential iPhone Usability and Interface Improvements", Retrieved from: <http://www.appleinsider.com/articles/08/09/18/potential_iphone_usability_and_interface_improvements.html> on Nov. 12, 2008, (Sep. 18, 2008), 4 pages.

Oryl, Michael "Review: Asus P527 Smartphone for North America", Retrieved from: <http://www.mobileburn.com/review.jsp?Id=4257> on Dec. 17, 2008., (Mar. 5, 2008), 1 Page.

Padilla, Alfredo "Palm Treo 750 Cell Phone Review—Hardware", Retrieved from: <http://www.wirelessinfo.com/content/palm-Treo-750-Cell-Phone-Review/Hardware.htm> on Dec. 11, 2008., (Mar. 17, 2007), 4 Pages.

Raghaven, Gopal et al., "Model Based Estimation and Verification of Mobile Device Performance", Retrieved from http://alumni.cs.ucsb.edu/~raimisl/emsoft04_12.pdf., (Sep. 27-29, 2004), 10 Pages.

Reed, Brad "Microsoft Demos Windows Mobile 6.1 at CTIA", Retrieve from: <http://www.networkworld.com/news/2008/040208-ctia-microsoft-windows-mobile.html> on Jul. 18, 2008., (Apr. 2, 2008), 1 page.

Remond, Mickael "Mobile Marketing Solutions", Retrieved from: <http://www.mobilemarketingmagazine.co.uk/mobile_social_networking/> on May 5, 2009., (Apr. 28, 2009), 16 Pages.

Rice, Stephen V., et al., "A System for Searching Sound Palettes", Retrieved from: <http://www.comparisonics.com/FindSoundsPalettePaper.pdf>, (Feb. 28-29, 2008), 6 pages.

Singh, Kundan et al., "CINEMA: Columbia InterNet Extensible Multimedia Architecture", Retrieved from http://www1.cs.columbia.edu/~library/TR-repository/reports/reports-2002/cucs-011-02.pdf, (Sep. 3, 2002), 83 Pages.

Steinicke, Frank et al., "Multi-Touching 3D Data: Towards Direct Interaction in Stereoscopic Display Environments coupled with Mobile Devices", Retrieved from: <http://viscg.uni-muenster.de/publications/2008/SHSK08/ppd-workshop.-pdf.>, (Jun. 15, 2008), 4 Pages.

Terpstra, Brett "Beta Beat: Grape, a New Way to Manage Your Desktop Clutter", Retrieved from: Beta Beat: Grape, a New Way to Manage Your Desktop Clutter on May 6, 2009., (Apr. 14, 2009), 16 Pages.

Vallerio, Keith S., et al., "Energy-Efficient Graphical User Interface Design", Retrieved from: <http://www.cc.gatech.edu/classes/AY2007/cs7470_fall/zhong-energy-efficient-user-interface.pdf>, (Jun. 10, 2004), pp. 1-13.

Wilson, Tracy V., "How the iPhone Works", Retrieved from: <http://electronics.howstuffworks.com/iphone2.htm> on Apr. 24, 2009, (Jan. 2007), 9 pages.

Yang, Seungji et al., "Semantic Photo Album Based on MPEG-4 Compatible Application Format", Retrieved from: <http://ieeexplore.ieee.org/stamp/stamp.jsp?arnumber=04146254.>, (2007), 2 Pages.

"Non-Final Office Action", U.S. Appl. No. 12/244,545, (Aug. 17, 2011), 15 pages.

"Non-Final Office Action", U.S. Appl. No. 12/413,977, (Jul. 19, 2011), 17 pages.

"Non-Final Office Action", U.S. Appl. No. 12/414,382, (Jul. 26, 2011), 9 pages.

"Non-Final Office Action", U.S. Appl. No. 12/414,434, (Aug. 2, 2011), 6 pages.

"Non-Final Office Action", U.S. Appl. No. 12/414,455, (Aug. 29, 2011), 8 pages.

"Non-Final Office Action", U.S. Appl. No. 12/414,458, (Jul. 6, 2011), 8 pages.

"Non-Final Office Action", U.S. Appl. No. 12/414,476, (Aug. 3, 2011), 21 pages.

"Non-Final Office Action", U.S. Appl. No. 12/433,605, (Jun. 24, 2011), 10 pages.

"Non-Final Office Action", U.S. Appl. No. 12/433,667, (Jun. 7, 2011), 15 pages.

"Non-Final Office Action", U.S. Appl. No. 12/469,458, (Jul. 1, 2011), 15 pages.

"Non-Final Office Action", U.S. Appl. No. 12/484,799, (Aug. 11, 2011), 12 pages.

"Notice of Allowance", U.S. Appl. No. 12/414,458, (Aug. 10, 2011), 6 pages.

"PCT Search Report", Application Serial No. PCT/US2009/061864, (May 14, 2010),10 pages.

"International Search Report", Mailed Date: Dec. 29, 2010, Application No. PCT/US2010/034772, Filed Date: May 13, 2010, pp. 12.

"PCT Search Report and Written Opinion", Application No. PCT/US2009/061382, (May 26, 2010),10 pages.

"PCT Search Report and Written Opinion", Application No. PCT/US2009/061735, (Jun. 7, 2010),11 pages.

"Final Office Action", U.S. Appl. No. 12/244,545, (Dec. 7, 2011), 16 pages.

"Final Office Action", U.S. Appl. No. 12/413,977, (Nov. 17, 2011), 16 pages.

"Final Office Action", U.S. Appl. No. 12/414,382, (Dec. 23, 2011), 7 pages.

"Final Office Action", U.S. Appl. No. 12/414,476, (Dec. 1, 2011), 20 pages.

"Final Office Action", U.S. Appl. No. 12/433,667, (Sep. 13, 2011), 17 pages.

"Final Office Action", U.S. Appl. No. 12/469,458, (Nov. 17, 2011), 15 pages.

"Non-Final Office Action", U.S. Appl. No. 12/469,480, (Sep. 22, 2011), 14 pages.

"Non-Final Office Action", U.S. Appl. No. 12/470,558, (Nov. 22, 2011), 9 pages.

"Non-Final Office Action", U.S. Appl. No. 12/484,845, (Dec. 7, 2011), 16 pages.

"Non-Final Office Action", U.S. Appl. No. 12/560,081, (Dec. 7, 2011), 16 pages.

"Notice of Allowance", U.S. Appl. No. 12/414,458, (Oct. 31, 2011), 2 pages.

"Notice of Allowance", U.S. Appl. No. 12/414,458, (Nov. 29, 2011),2 pages.

La, Nick "Parallax Gallery", Available at <http://webdesignerwall.comtutorials/parallax-gallery/comment-page-1>,(Apr. 25, 2008), 16 pages.

Roberts, Neil "Touching and Gesturing on the iPhone", Available at <http://www.sitepen.com/blog/2008/07/10/touching-and-gesturing-on-the-iphone/comments-pare-1>,(Jul. 10, 2008), 16 pages.

"Advisory Action", U.S. Appl. No. 12/414,382, (Jan. 20, 2012), 3 pages.

"Final Office Action", U.S. Appl. No. 12/433,605, (Feb. 3, 2012), 11 pages.

"Final Office Action", U.S. Appl. No. 12/469,480, (Feb. 9, 2012), 17 pages.

"Final Office Action", U.S. Appl. No. 12/560,081, (Mar. 14, 2012), 16 pages.

"Non-Final Office Action", U.S. Appl. No. 12/244,545, (Mar. 27, 2012), 18 pages.

"Non-Final Office Action", U.S. Appl. No. 12/414,434, (Jan. 17, 2012), 7 pages.

"Non-Final Office Action", U.S. Appl. No. 12/433,667, (Feb. 3, 2012), 16 pages.

"Notice of Allowance", U.S. Appl. No. 12/414,455, (Jan. 4, 2012), 4 pages.

Beiber, Gerald et al., "Screen Coverage: A Pen-Interaction Problem for PDA's and Touch Screen Computers", In Proceedings of ICWMC 2007,(Mar. 2007), 6 pages.

Wyatt, Paul "/Flash/the art of parallax scrolling", .net Magazine,(Aug. 1, 2007), pp. 74-76.

"Final Office Action", U.S. Appl. No. 12/244,545, (Sep. 7, 2012), 23 pages.

"Non-Final Office Action", U.S. Appl. No. 12/469,458, (Sep. 21, 2012), 14 pages.

"Non-Final Office Action", U.S. Appl. No. 13/492,495, (Sep. 17, 2012), 8 pages.

"Notice of Allowance", U.S. Appl. No. 12/414,434, (Aug. 17, 2012), 4 pages.

"Notice of Allowance", U.S. Appl. No. 12/470,558, (Aug. 23, 2012), 2 pages.

"Advisory Action", U.S. Appl. No. 12/433,605, (Apr. 5, 2012), 3 pages.

"Extended European Search Report", European Patent Application No. 09818253.8, (Apr. 10, 2012), 7 pages.

"Final Office Action", U.S. Appl. No. 12/484,799, (Apr. 30, 2012), 13 pages.

"Non-Final Office Action", U.S. Appl. No. 12/413,977, (Jul. 20, 2012), 18 pages.

"Non-Final Office Action", U.S. Appl. No. 12/414,434, (May 31, 2012), 7 pages.

"Non-Final Office Action", U.S. Appl. No. 12/480,969, (Aug. 7, 2012), 15 pages.

"Non-Final Office Action", U.S. Appl. No. 12/484,799, (Aug. 7, 2012), 13 pages.

"Notice of Allowance", U.S. Appl. No. 12/414,382, (Apr. 4, 2012), 4 pages.

"Notice of Allowance", U.S. Appl. No. 12/470,558, (Apr. 2, 2012), 7 pages.

"Notice of Allowance", U.S. Appl. No. 12/484,845, (Mar. 16, 2012), 5 pages.

"Final Office Action", U.S. Appl. No. 12/433,667, (Jan. 7, 2013), 17 pages.

"Final Office Action", U.S. Appl. No. 12/480,969, (Nov. 23, 2012), 18 pages.

"Foreign Office Action", Chinese Application No. 201080015728.1, (Dec. 26, 2012), 9 pages.

"Foreign Office Action", Chinese Application No. 201080015788.3, (Dec. 24, 2012), 10 pages.

"Foreign Office Action", Chinese Application No. 201080023212.1, (Dec. 5, 2012), 10 pages.

"Non-Final Office Action", U.S. Appl. No. 12/414,476, (Nov. 9, 2012), 22 pages.

"Non-Final Office Action", U.S. Appl. No. 12/433,605, (Jan. 11, 2013), 7 pages.

"Non-Final Office Action", U.S. Appl. No. 12/469,480, (Oct. 17, 2012), 16 pages.

"Non-Final Office Action", U.S. Appl. No. 13/492,495, (Dec. 19, 2012), 6 pages.

"Notice of Allowance", U.S. Appl. No. 12/484,799, (Oct. 22, 2012), 10 pages.

"Extended European Search Report", European Patent Application No. 09822736.6, (Dec. 18, 2012), 7 pages.

"Final Office Action", U.S. Appl. No. 12/469,458, (Feb. 1, 2013), 19 pages.

"Foreign Office Action", Chinese Application No. 200980142632.9, (Jan. 29, 2013), 11 pages.

"Foreign Office Action", Chinese Application No. 200980142661.5, (Jan. 21, 2013), 12 pages.

Crouch, Dennis "Smartphone Wars: Micron's Slide-to-Unlock Patent", (Jan. 30, 2013), 2 pages.

\* cited by examiner

500

502
Configure a user interface to include a plurality of representations of content arranged according to a plurality of columns that permit navigation between first and second columns upon detection of a gesture input via a touchscreen of the mobile communications device

504
Display the user interface on a display device of the mobile communications device in which the first column is configured for vertical navigation through each of the plurality of representations and the second column includes a filtered subset of the plurality of representations such that at least one representation is included in the first column and not the second column

602
Display representations of content in a first column on a display device as separated by a space from a concurrent display of partial representations of content in a second column

604
If a gesture is detected via touchscreen functionality of the display device that involves interaction with the space, display representations of content in the second column concurrently with partial representations of content in the first column

606
If a pan gesture is detected by the one or more modules via touchscreen functionality, display the representations in the first and second columns as having a matching font size

702
Configure representations of contacts in a first column to have a font size that is larger than a font size of representations of contacts in the second column

↓

704
if a pan gesture is detected by the mobile communications device, display the representations in the first and second columns as having a matching font size

*Fig. 7*

COLUMN ORGANIZATION OF CONTENT

RELATED APPLICATIONS

This application claims priority under 35 U.S.C. Section 119(e) to U.S. Provisional Patent Applications Nos. 61/107,945, 61/107,935, and 61/107,921, each of which was filed on Oct. 23, 2008, the entire disclosures of which are hereby incorporated by reference.

BACKGROUND

Mobile communication devices (e.g., wireless phones) have become an integral part of everyday life. However, the form factor employed by conventional mobile communications devices is typically limited to promote mobility of the mobile communications device.

For example, the mobile communications device may have a relatively limited amount of display area when compared to a conventional desktop computer, e.g., a PC. In another example, the mobile communications device may have limited input functionality (e.g., a keyboard having a reduced size) when compared with a conventional desktop computer. Therefore, conventional techniques used to interact with a desktop computer may be inefficient when employed by a mobile communications device.

SUMMARY

Column organization of content is described. In an implementation, a mobile communications device configures a user interface to include a plurality of representations of content arranged according to a plurality of columns that permits navigation between first and second said columns upon detection of a gesture input via a touchscreen of the mobile communications device. The user interface is displayed on a display device of the mobile communications device. The first column is configured for vertical navigation through each of the plurality of representations and the second column includes a filtered subset of the plurality of representations such that at least one of the representations is included in the first column and not the second column.

In an implementation, a mobile communications device includes a display device and one or more modules to display representations of content in a first column on the display device as separated by a space from a concurrent display of partial representations of content in a second column. If a gesture is detected via touchscreen functionality of the display device that involves interaction with the space, representations of content in the second column are displayed concurrently with partial representations of content in the first column.

In an implementation, one or more computer-readable media include instructions that are executable by a mobile communications device to configure representations of contacts in a first column to have a font size that is larger than a font size of representations of contacts in the second column. If a pan gesture is detected by the mobile communications device, the representations in the first and second columns are displayed as having a matching font size.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 5 is a flow diagram depicting a procedure in an example implementation in which a user interface is configured to include a plurality of representations displayed in columns, at least one of which includes a filtered subset of representations.

FIG. 6 is a flow diagram depicting a procedure in an example implementation in which a gesture that involves interaction with a space is used to navigate between columns of representations.

FIG. 7 is a flow diagram depicting a procedure in an example implementation in which representations are displayed as having a matching font size in response to detection of a pan gesture.

DETAILED DESCRIPTION

Overview

Users sometimes desire access to related sets of content, such as family pictures, pictures taken in a particular date range (e.g., of a trip), and so on. However, in a traditional hub-and-spoke system that is used to organize content, navigation is typically performed to an item of content and then "back out" to get to another item of content. This may be inefficient and result in user frustration especially when performing this navigation on devices that have a limited amount of display area, such as a mobile communications device.

Column organization of content is described. In an implementation, representations of content are arranged in vertical columns that are accessible "next to each other" along a horizontal axis. Therefore, a user may scroll through representations of content vertically in each of the columns and navigate horizontally between the columns. Further, the columns may be configured in the user interface to include a space (e.g., a "gutter") between the columns. Selection of the space via a gesture (e.g., a tap on a touchscreen) may cause the next column to be displayed. Therefore, navigation may be performed between the columns without adding chrome (e.g., a display of a button) to the user interface, further discussion of which may be found in relation to FIGS. 2-3.

Additionally, the columns may be configured in a variety of ways. For example, filtering may be employed to separate the representations into groups. A first column, for instance, may include each contact from a user's contact list. A second column may include contacts for a social network, while a third column may include contacts for instant messaging. Thus, filtering may be used such that a user may navigate through successive columns of content that is filtered according to different criteria to locate content of interest. Further discussion of filtering may be found in relation to FIG. 5.

In the following discussion, a variety of example implementations of a mobile communications device (e.g., a wireless phone) are described. Additionally, a variety of different functionality that may be employed by the mobile communications device is described for each example, which may be implemented in that example as well as in other described examples. Accordingly, example implementations are illustrated of a few of a variety of contemplated implementations. Further, although a mobile communications device having one or more modules that are configured to provide telephonic functionality are described, a variety of other mobile devices are also contemplated, such as personal digital assistants, mobile music players, dedicated messaging devices, portable game devices, netbooks, and so on.

Example Implementations

Figure 1:
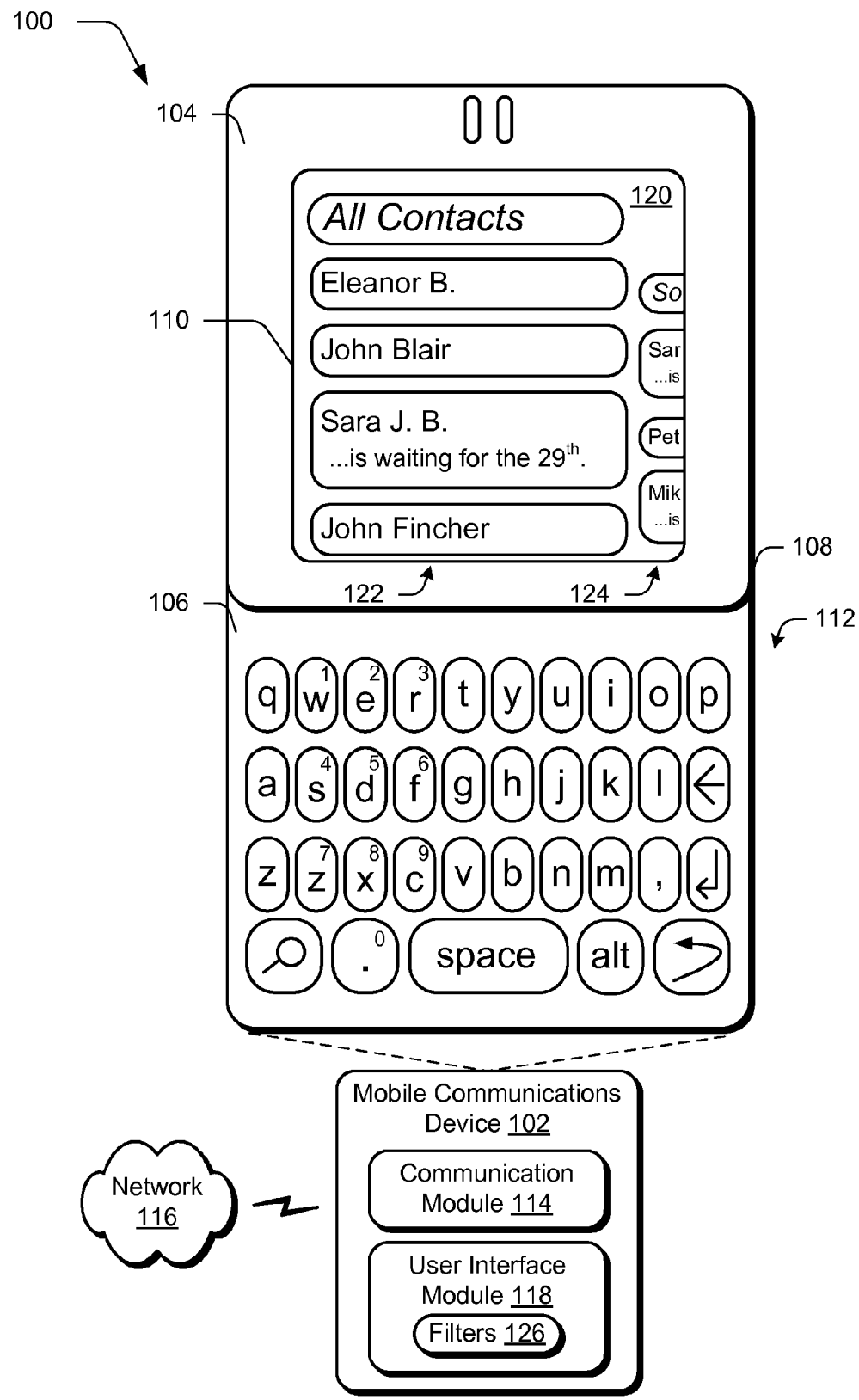
FIG. 1 is an illustration of an example implementation of a mobile communications device in accordance with one or more embodiments of devices, features, and systems for mobile communications.
Figure 2:
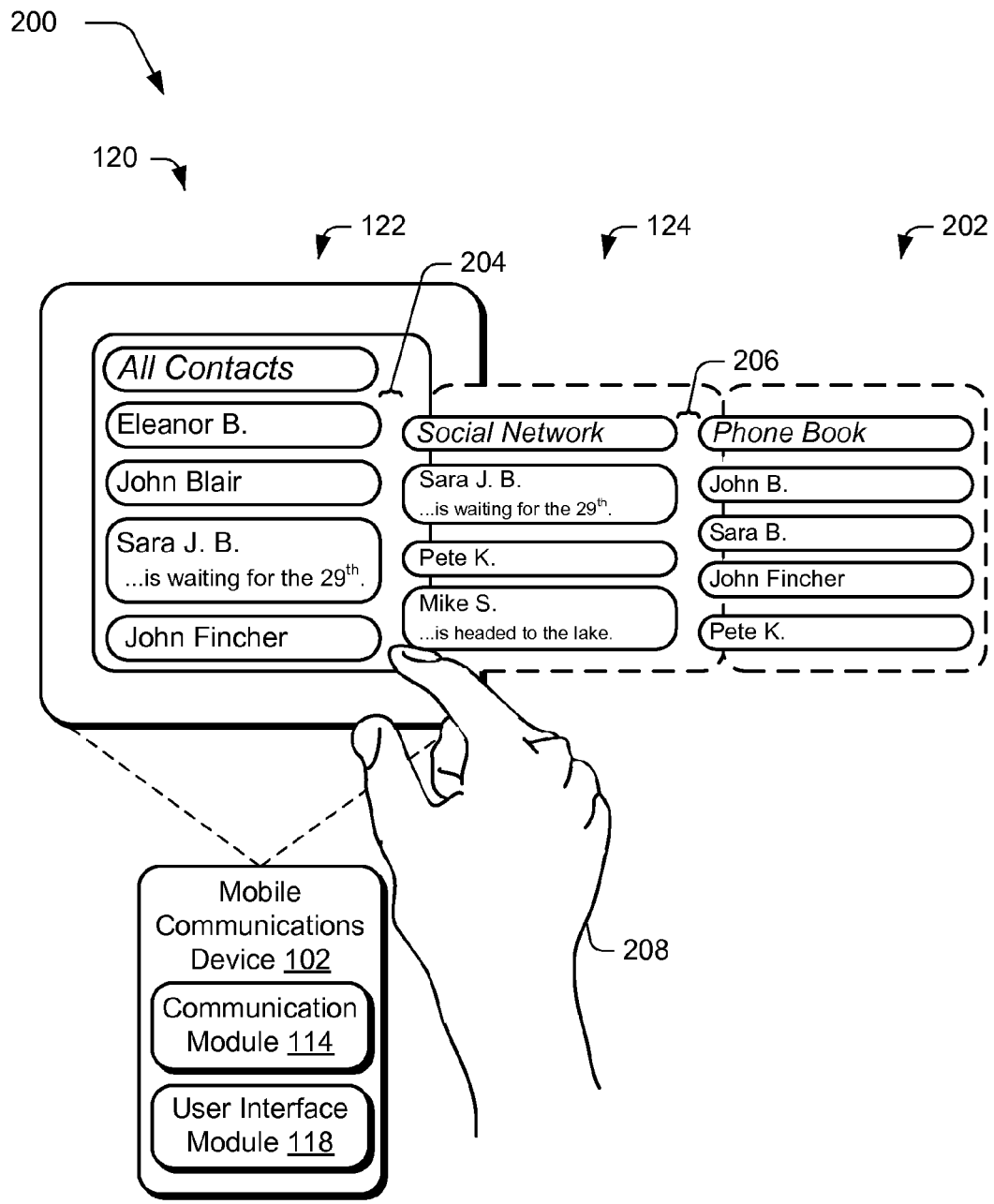
FIG. 2 is an illustration of a system in an example implementation in which detection of a gesture is used to navigate between first and second columns in a user interface of FIG. 1.
Figure 3:
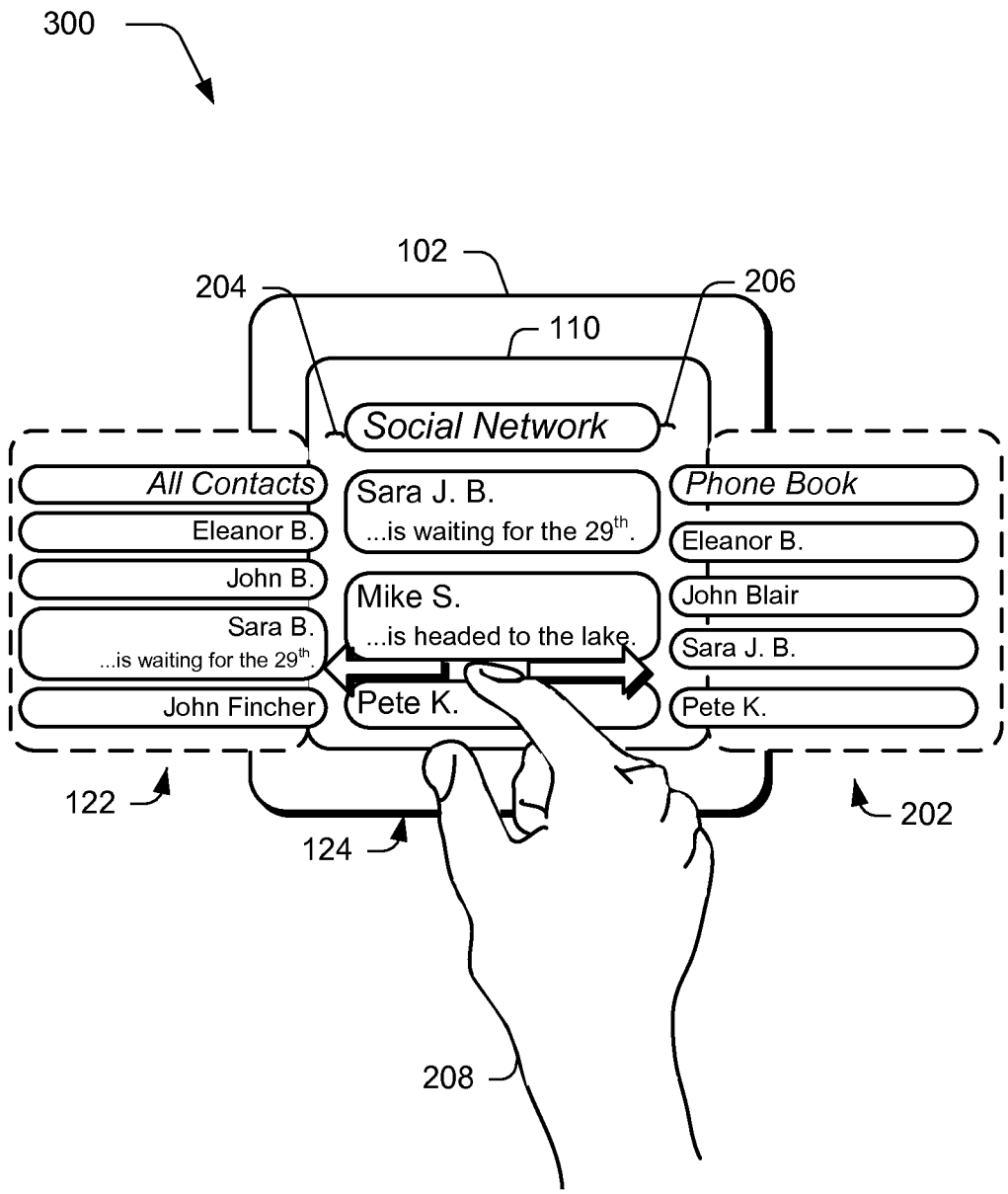
FIG. 3 is an illustration of a system in an example implementation in which the second column of the user interface that was selected through interaction with a space by a gesture of FIG. 2 is output in the user interface.
Figure 4:
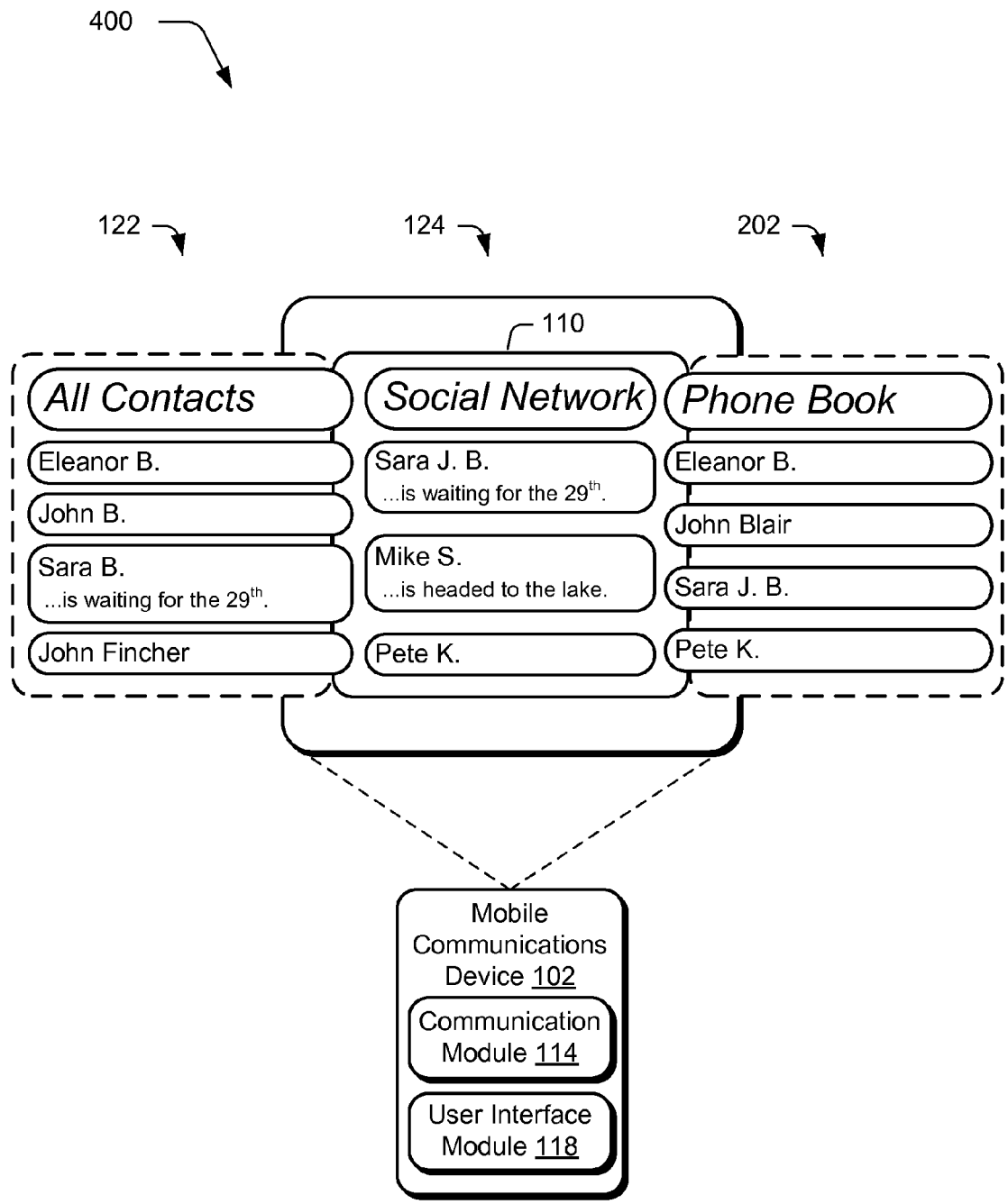
FIG. 4 illustrates an example system in which representations of content in a plurality of columns are displayed as having a matching font size in response to detection of a gesture of FIG. 3.

FIG. 1 is an illustration of an example implementation 100 of a mobile communications device 102 in accordance with one or more embodiments of devices, features, and systems for mobile communications. The mobile communications device 102 is operable to assume a plurality of configurations, examples of which include a configuration as illustrated in FIG. 1 in which the mobile communications device 102 is "open" and a configuration in which the mobile communications device 102 is "closed" as illustrated in FIGS. 2-4.

The mobile communications device 102 is further illustrated as including a first housing 104 and a second housing 106 that are connected via a slide 108 such that the first and second housings 104, 106 may move (e.g., slide) in relation to one another. Although sliding is described, it should be readily apparent that a variety of other movement techniques are also contemplated, e.g., a pivot, a hinge and so on. Additionally, configurations are also contemplated in which movement is not performed, such as a "brick" configuration.

The first housing 104 includes a display device 110 that may be used to output a variety of data, such as a caller identification (ID), representations of content (e.g., contacts) as illustrated, email, multimedia messages, Internet browsing, game play, music, video and so on. In an implementation, the display device 110 may also be configured to function as an input device by incorporating touchscreen functionality, e.g., through capacitive, surface acoustic wave, resistive, optical, strain gauge, dispersive signals, acoustic pulse, and other touchscreen functionality.

The second housing 106 is illustrated as including a keyboard 112 that may be used to provide inputs to the mobile communications device 102. Although the keyboard 112 is illustrated as a QWERTY keyboard, a variety of other examples are also contemplated, such as a keyboard that follows a traditional telephone keypad layout (e.g., a twelve key numeric pad found on basic telephones), keyboards configured for other languages (e.g., Cyrillic), and so on.

In the "open" configuration as illustrated in the example implementation 100 of FIG. 1, the first housing 104 is moved (e.g., slid) "away" from the second housing 106 using the slide 108. In this example configuration, at least a majority of the keys of the keyboard 112 (i.e., the physical keys) is exposed such that the exposed keys are available for use to provide inputs. The open configuration results in an extended form factor of the mobile communications device 102 as contrasted with the form factor of the mobile communications device 102 in the closed configuration of FIGS. 2-4. In an implementation, the planes of the first and second housings 104, 106 that are used to define the extended form factor are parallel to each other. Other implementations are also contemplated, such as a "clamshell" configuration, "brick" configuration, and so on.

The form factor employed by the mobile communications device 102 may be suitable to support a wide variety of features. For example, the keyboard 112 is illustrated as supporting a QWERTY configuration. This form factor may be particularly convenient to a user to utilize the previously described functionality of the mobile communications device 102, such as to compose texts, play games, check email, "surf" the Internet, provide status messages for a social network, and so on.

The mobile communications device 102 is also illustrated as including a communication module 114. The communication module 114 is representative of functionality of the mobile communications device 102 to communicate via a network 116. For example, the communication module 114 may include telephone functionality to make and receive telephone calls. The communication module 114 may also include a variety of other functionality, such as to form short message service (SMS) text messages, multimedia messaging service (MMS) messages, emails, status messages for a social network, and so on. A user, for instance, may input a status message for communication via the network 116 to a social network website. The social network website may then publish the status message to "friends" of the user, e.g., for receipt by the friends via a computer, respective mobile communications device, and so on. A variety of other examples are also contemplated, such as blogging, instant messaging, and so on.

The mobile communications device 102 is also illustrated as including a user interface module 118. The user interface module 118 is representative of functionality of the mobile communications device 102 to generate, manage, and/or output a user interface 120 for display on the display device 110. A variety of different techniques may be employed to generate the user interface 120.

For example, the user interface module 118 may configure the user interface 120 to arrange representations of content into vertical columns, an example of which is shown by first and second columns 122, 124 in the user interface 120. Thus, a user may scroll vertically through the first column 122 to locate a representation of interest, which in this instance is a contact from an "All Contacts" column.

The user interface module 118 may also employ one or more filters 126 to filter representations that are included in one or more of the columns. For instance, in some applications there may exist subsets of content that may be used to quickly identify the representations in that subset. By navigating between the subsets, a user may first identify a subset that is likely to contain the content of interest and then navigate through the reduced subset of representations.

Continuing with the previous example, the first column 122 includes representations of each contact included in a user's contacts list, e.g., which may be stored on the mobile communications device 102. The second column 124 may then contain a subset of contacts that correspond to a criteria used to filter the contacts, such as contacts that belong to a social network. Filtering may be continued for subsequent columns, such as for contacts that support text messaging, include email addresses, have phone numbers (e.g., a telephone book), identified as business contacts (e.g., business phone numbers and addresses), and so on. Thus, navigation may be performed horizontally through the user interface through different column for subsets of content to locate content of interest.

In the illustrated implementation of the user interface 120 of FIG. 1, complete representations are illustrated for the first column 122 and partial representations are illustrated for the second column 124. For instance, the representations in the first column 122 are displayed having their full width while the partial representations of the second column 124 are truncated at an edge of the display device 120 and thus display a partial width in the user interface 120. Using this technique, a user is readily made aware as to the availability of the second column 124 "to the right" of the first column 122 in the user interface 120 without consuming a significant portion of the available display area of the display device 110. Navigation may be performed to the second column 124 in a variety of ways, further discussion of which may be found in relation to the following figure.

FIG. 2 illustrates a system 200 in an example implementation in which detection of a gesture is used to navigate between first and second columns 122, 124 in the user interface 120. The mobile communications device 102 is illustrated as displaying a user interface 120 on the display device 110, which includes the full width of representations in the first column 122 and partial representations in the second column 124 as previously illustrated in FIG. 1. However, the entire width the representations of the second column 124 and a third column 202 are illustrated in phantom "off" the display device 110 to give context as to an arrangement of the first, second, and third columns 122, 124, 202 in the user interface 120.

The first and second columns 122, 124 (and more particularly representations included in the respective columns) are illustrated as separated by a space 204. Likewise, the second and third columns 124, 202 are also illustrated as separated by a space 206. In the illustrated implementation, the space 204 is configured for use in chromeless navigation between the first and second columns 122, 124. Likewise, space 206 is configured for use in navigation between the second and third columns 124, 202.

In an implementation, the user interface module 118 is configured to detect a gesture input via touchscreen functionality of the display device 110. For example, a finger of a user's hand 208 may tap the space 204 between the first and second columns 122, 124. Upon detection of this gesture (the tap), the user interface module 118 causes the second column 124 to be displayed in the user interface 120, an example of which is shown in the following figure.

FIG. 3 illustrates a system 300 in an example implementation in which the second column 124 that was selected through interaction with the space 204 by the gesture of FIG. 2 is output in the user interface 120. The user interface 120 includes the first, second, and third columns 122, 124, 202 of FIG. 2. In this instance, however, the second column 124 is displayed on the display device 110 as having one or more representations that are displayed in their entirety, e.g., has a full width for representations even though each of the representations in the column might not be displayed concurrently (e.g., for vertical scrolling). The first and third columns 124, 202 are displayed with partial representations to indicate "where" the respective columns are located in relation to the second column 124. Thus, a user may readily ascertain "where" the first and third columns 124, 202 are positioned in relation to the second column 124.

In FIG. 3, like FIG. 2, the column that is in "focus" (e.g., the second column 124 in FIG. 3 and the first column 122 in FIGS. 1 and 2) is displayed as having representations that have a greater height than representations in columns that are not displayed in their entirety, i.e., partial representations of the second column 124 in FIGS. 1 and 2 and the first and third columns 122, 202 of FIG. 3. For example, the representations of the second column 124 are displayed as having a greater font size than the font size of the representations of the first and third columns 122, 202. Additionally, the representations of the first column 122 are illustrated as being realigned (e.g., text of the representations is right justified in FIG. 3 as opposed to left justified in FIGS. 1 and 2) to aid in the descriptions provided by the respective representations. It should be readily apparent, however, that such realignment may not be performed in a variety of instances, such as to conserve processing and/or display resources.

Therefore, in addition to the truncation of the representations of the first and third columns to show "where" the columns are located in relation to the second column 124, the first and third columns 122, 202 are also displayed with a reduced height such that a lesser amount of display area of the display device 110 is consumed by those columns. Thus, this technique may also help to increase focus given to the second column 124 being displayed yet still provide an awareness of "where" the user is located in the user interface 120.

A user may continue to navigate through the columns by selecting successive spaces to the "right" in this example to navigate to respective columns, e.g., space 206 to navigate to the third column 202 and so on. Additionally, the user may navigate "back" through the columns by selecting spaces to the left of the currently displayed column (e.g., space 204 to the left of the second column 124) in the user interface 120 in this example. In some instances, however, the user may wish to quickly scroll through the columns without interacting with each of the spaces. This navigation may be performed in a variety of ways.

For example, the user's hand 208 may make a pan gesture by placing a finger on the display device 110 and moving the finger to the left and/or right in this example, although other examples are also contemplated. Touchscreen functionality of the display device 110 (or other device such as a track pad) may then be used to communicate data to the user interface module 118 that describes this gesture. In response, the user interface module 118 may configure the user interface 120 to assume a mode in which representations of content are displayed in a matching size, e.g., the font size of the representations of the content matches between columns. Additionally, the user interface module 118 may configure identifiers of the columns to have an increased size such that a user may navigate through the columns in a quicker manner to locate a column of interest, further discussion of which may be found in relation to the following figure.

FIG. 4 illustrates an example system 400 in which representations of content in a plurality of columns are displayed as having a matching font size in response to detection of a gesture of FIG. 3. In this example system 400, the first, second, and third columns 122, 124, 202 are configured to have a matching font size. For example, the font size of the columns located "off" the display device 110 may be configured to match the column that is in focus. Additionally, identifiers of each of the columns (e.g., "All Contacts" for the first column 122, "Social Network" for the second column 124, and "Phone Book" for the third column 202) may have an increased size (e.g., a larger font size) to improve legibility.

When in this mode the columns may be panned to locate a particular column of interest. Selecting the column (e.g., tapping on the identifier and/or representations in the column) may cause the user interface module 118 to display the selected column "in focus" as shown for the first column 122 in FIG. 1 and the second column 124 in FIGS. 2 and 3. In an implementation, when in this "zoomed out" mode the columns may be navigated by a pan gesture and/or selecting the space as previously described in relation to FIG. 2. Further, in an implementation the representations in the columns are not selectable in and of themselves to navigate to corresponding content. Rather, focus is first given to the column through the first selection, which may then permit selection of a particular column. It should be readily apparent that other implementations are also contemplated without departing from the spirit and scope thereof, such to enable selection of representations in both modes.

Example Procedures

The following discussion describes user interface techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to the environment 100 and systems 200-400 of FIGS. 1-4, respectively.

FIG. 5 depicts a procedure 500 in an example implementation in which a user interface is configured to include a plurality of representations for display in columns, at least one of which includes a filtered subset of representations. A user interface is configured to include a plurality of representations of content arranged according to a plurality of columns that permit navigation between first and second columns upon detection of a gesture input via a touchscreen of the mobile communications device (block 502). For example, a user may "tap" the space 204 between the first and second columns 122, 124 to navigate to the second column 124.

The user interface is displayed on a display device of the mobile communications device in which the first column is configured for vertical navigation through each of the plurality of representations and the second column includes a filtered subset of the plurality of representations such that at least one representation is included in the first column and not the second column (block 504). For example, a pan gesture may involve placing a finger of the user's hand 208 on a surface of the display device 110 and dragging the finger across the surface. The user interface module 118 may then detect this gesture and cause the user interface 120 to move in a direction that follows the movement of the finger. Therefore, a pan gesture that involves dragging the finger of the user's hand 208 "up" in the illustrated system 200 to cause representations included in a column "below" a current view to be displayed.

FIG. 6 depicts a procedure 600 in an example implementation in which a gesture that involves interaction with a space is used to navigate between columns of representations. Representations of content are displayed in a first column on a display device as separated by a space from a concurrent display of partial representation of content in a second column (block 602). As described previously in relation to FIG. 2, for instance, the spaces 204, 206 may be used to separate representations of content in the first, second, and third columns 122, 124, 202.

If a gesture is detected via touchscreen functionality of the display device that involves interaction with the space, representations of content in the second column are displayed concurrently with partial representations of content in the first column (block 604). Like above, a user may "tap" the space 204 between the first and second columns 122, 124 to navigate to the second column 124.

If a pan gesture is detected by the one or more modules via touchscreen functionality, the representations in the first and second columns are displayed as having a matching font size (block 606). For example, a horizontal pan gesture may be detected that involves dragging a finger of the user's hand 208 horizontally across the display device. When this gesture is detected, the representations may be displayed as having substantially similar sizes, an example of which may be found in relation to FIG. 4.

FIG. 7 depicts a procedure 700 in an example implementation in which representations are displayed as having a matching font size in response to detection of a pan gesture. Representations of contacts are configured in a first column to have a font size that is larger than a font size of representations of contacts in a second column (block 702). As shown in FIG. 1, for instance, the font size of representations in the first column 122 is larger than the font size of representations in the second column 124.

If a pan gesture is detected by the mobile communications device, display the representations in the first and second columns as having a matching font size (block 704). An example of this is shown in FIG. 4 in which the representations of content (contacts in this instance) have a matching font size.

Example Device

Figure 8:
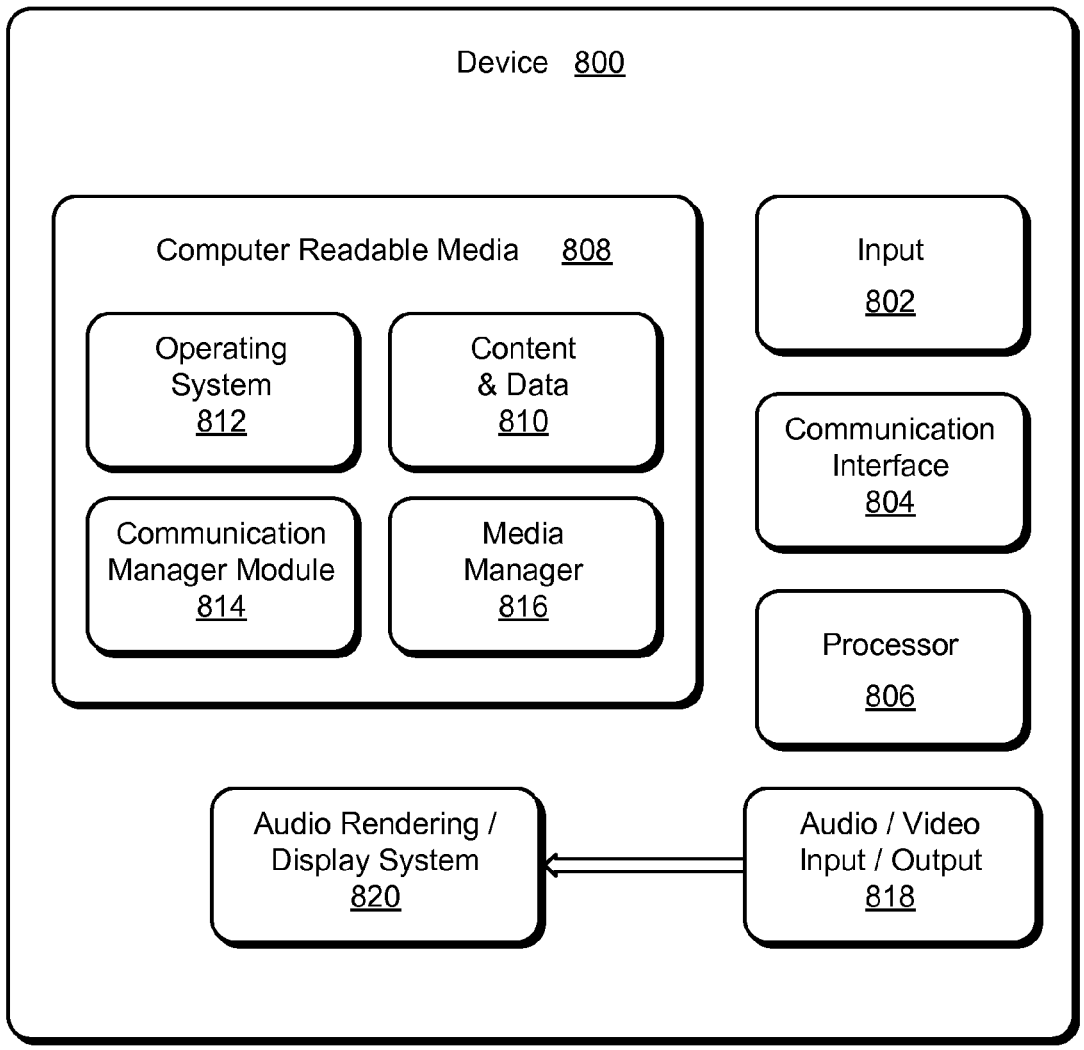
FIG. 8 illustrates various components of an example device that can be implemented in various embodiments as any type of a mobile device to implement embodiments of devices, features, and systems for mobile communications.

FIG. 8 illustrates various components of an example device 800 that can be implemented in various embodiments as any type of a mobile device to implement embodiments of devices, features, and systems for mobile communications. For example, device 800 can be implemented as any of the mobile communications devices 102 described with reference to respective FIGS. 1-4. Device 800 can also be implemented to access a network-based service, such as a social network service.

Device 800 includes an input 802 that may include Internet Protocol (IP) inputs as well as other input devices, such as the keyboard 112 of FIG. 1. Device 800 further includes a communication interface 804 that can be implemented as any one or more of a wireless interface, any type of network interface, and as any other type of communication interface. A network interface provides a connection between device 800 and a communication network by which other electronic and computing devices can communicate data with device 800. A wireless interface enables device 800 to operate as a mobile device for wireless communications.

Device 800 also includes one or more processors 806 (e.g., any of microprocessors, controllers, and the like) which process various computer-executable instructions to control the operation of device 800 and to communicate with other electronic devices. Device 800 can be implemented with computer-readable media 808, such as one or more memory components, examples of which include random access memory (RAM) and non-volatile memory (e.g., any one or more of a read-only memory (ROM), flash memory, EPROM, EEPROM, etc.).

Computer-readable media 808 provides data storage to store content and data 810, as well as device applications and any other types of information and/or data related to operational aspects of device 800. For example, an operating system 812 can be maintained as a computer application with the computer-readable media 808 and executed on processor(s) 806. Device applications can also include a communication manager module 814 (which may be used to provide telephonic functionality) and a media manager 816.

Device 800 also includes an audio and/or video output 818 that provides audio and/or video data to an audio rendering and/or display system 820. The audio rendering and/or display system 820 can be implemented as integrated components of the example device 800, and can include any components that process, display, and/or otherwise render audio, video, and image data. Device 800 can also be implemented to provide a user tactile feedback, such as vibrate and haptics.

Generally, the blocks may be representative of modules that are configured to provide represented functionality. Further, any of the functions described herein can be implemented using software, firmware (e.g., fixed logic circuitry), manual processing, or a combination of these implementations. The terms "module," "functionality," and "logic" as used herein generally represent software, firmware, hardware or a combination thereof. In the case of a software implementation, the module, functionality, or logic represents program code that performs specified tasks when executed on a processor (e.g., CPU or CPUs). The program code can be stored in one or more computer readable memory devices. The features of the techniques described above are platform-independent, meaning that the techniques may be implemented on a variety of commercial computing platforms having a variety of processors.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method performed by a mobile communications device comprising: configuring a user interface to include a plurality of representations of content arranged according to a plurality of columns, separated by a space, that permits navigation between first full and second partial said columns upon detection of a gesture input via a touchscreen of the mobile communications device; and displaying the user interface on a display device of the mobile communications device in which: the first full said column is configured for vertical navigation through each of the plurality of representations; and the second partial said column includes a filtered subset of the plurality of representations such that at least one said representation is included in the first full said column and not the second partial said column, the filtered subset of the plurality of representations included in the second partial said column are also included in the first full said column.

2. A method as described in claim 1, wherein the displaying is performed such that: an entire width of one or more said representations included in the first full said column is displayed on the display device; a portion of a width of at least one said representation included in the second partial said column is displayed concurrently on the display device with the first full said column; and the one or more representations of the first full said column are separated by said space from the portion of the at least one said representation of the second partial said column.

3. A method as described in claim 2, wherein the gesture includes a tap of the space between the first full and second partial said columns.

4. A method as described in claim 1, wherein the gesture is not a pan gesture.

5. A method as described in claim 1, wherein the user interface is further configured by the mobile communications device such that detection of a pan gesture causes the representations arranged in the columns to be displayed to have a substantially similar width.

6. A method as described in claim 1, wherein representations in the first full said column to have a font size that is larger than a font size of representations in the second partial said column.

7. A method as described in claim 6, wherein the user interface is further configured by the mobile communications device such that detection of a pan gesture causes the representations arranged in the columns to employ a substantially similar font size.

8. A method as described in claim 1, wherein the content is contact information.

9. A mobile communications device comprising a display device and one or more modules to: display full representations of content in a first column on the display device as separated by a space from a concurrent display of partial representations of content in a second column; and if a gesture is detected via touchscreen functionality of the display device that involves interaction with the space, display full representations of content in the second column concurrently with partial representations of content in the first column.

10. A mobile communications device as described in claim 9, wherein the partial representations are truncated at an edge of the display device.

11. A mobile communications device as described in claim 9, wherein the representations of content in the first and second columns correspond to a matching level of a hierarchical file system.

12. A mobile communications device as described in claim 9, wherein the interaction is a tap of the space.

13. A mobile communications device as described in claim 9, wherein: the representations in the first column to have a font size that is larger than a font size of representations in the second column; and if a pan gesture is detected by the one or more modules via touchscreen functionality, display the representations in the first and second columns as having a matching font size.

14. A mobile communications device as described in claim 9, wherein: the display is performed by the one or more modules before the gesture is detected such that the partial representations of content in the second column are displayed concurrently with full representations of the content in the first column; and the display is performed by the one or more modules after the gesture is detected such that the partial representations of content in the first column are displayed concurrently with full representations of the content in the second column.

15. One or more computer-readable media comprising instructions that are executable by a mobile communications device to:
configure representations of contacts in a first column to have a font size that is larger than a font size of representations of contacts in the second column; and if a pan gesture is detected by the mobile communications device, display the representations in the first and second columns as having a matching font size.

16. One or more computer-readable media as described in claim 15, wherein the representations in the first column are separated by a space from a concurrent display of representations of contacts in a second column that are displayed partially such that at least a portion of the representations of contacts in the second column is truncated.

17. One or more computer-readable media as described in claim 16, wherein if a tap gesture is detected that involves interaction with the space, display representations in the second column concurrently with partial representations of content in the first column such that at least a portion of the representations of contacts in the second column is truncated.

18. One or more computer-readable media as described in claim 15, wherein the first column includes representations of each of a plurality of the contacts that are accessible via vertical scrolling and the second column includes a subset of the representations such that at least one said representation included in the first column is not included in the second column.

19. One or more computer-readable media as described in claim 15, wherein: the first column is configured for vertical navigation through each of a plurality of the representations; and the second column includes a filtered subset of the plurality of the representations such that at least one said representation is included in the first column and not the second column.

* * * * *